Jan. 1, 1929.　　　　　　　　　　　　　　　　1,697,533
V. LINK
BRAKE
Filed July 6, 1926　　　　2 Sheets-Sheet 1
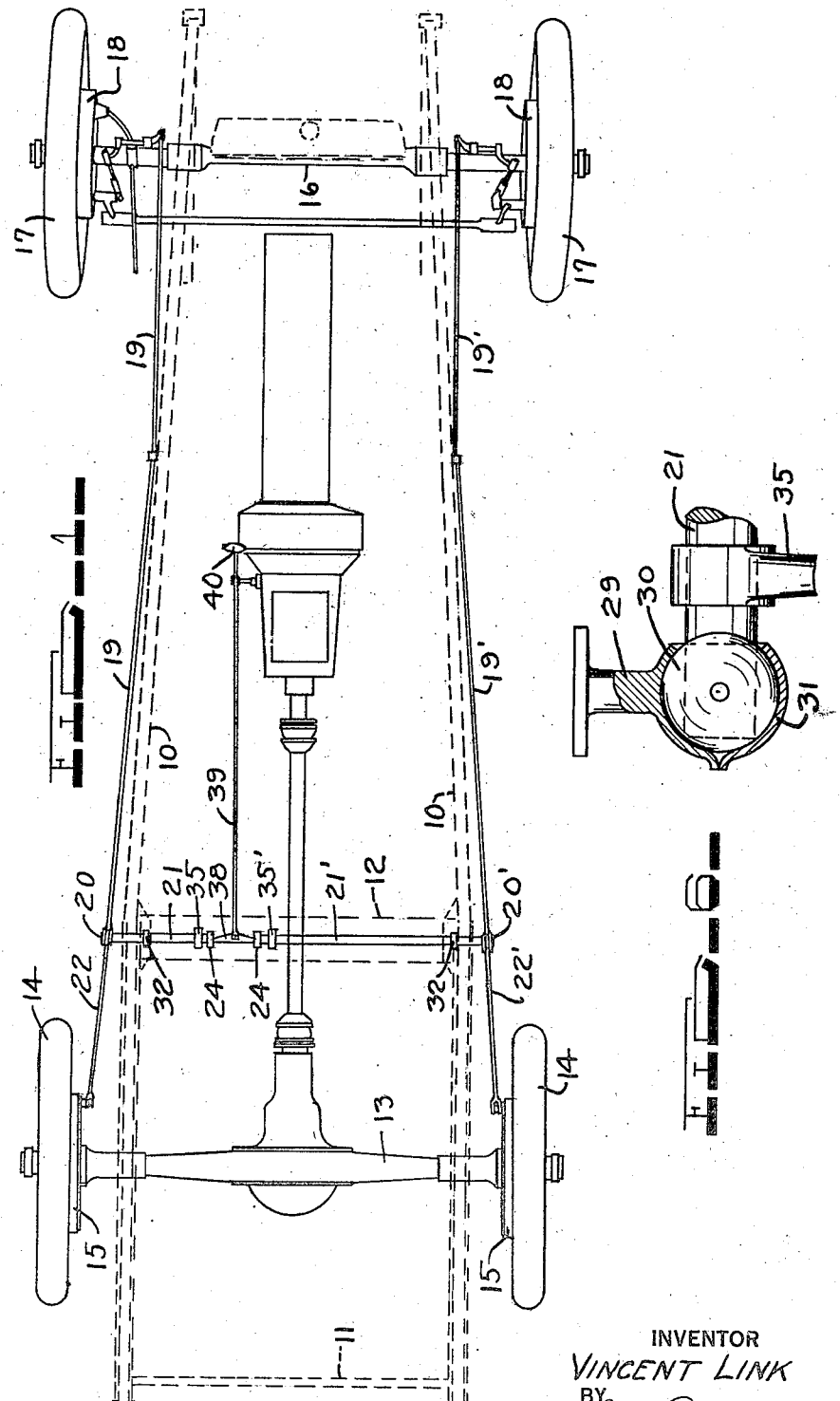
INVENTOR
VINCENT LINK
BY
ATTORNEY

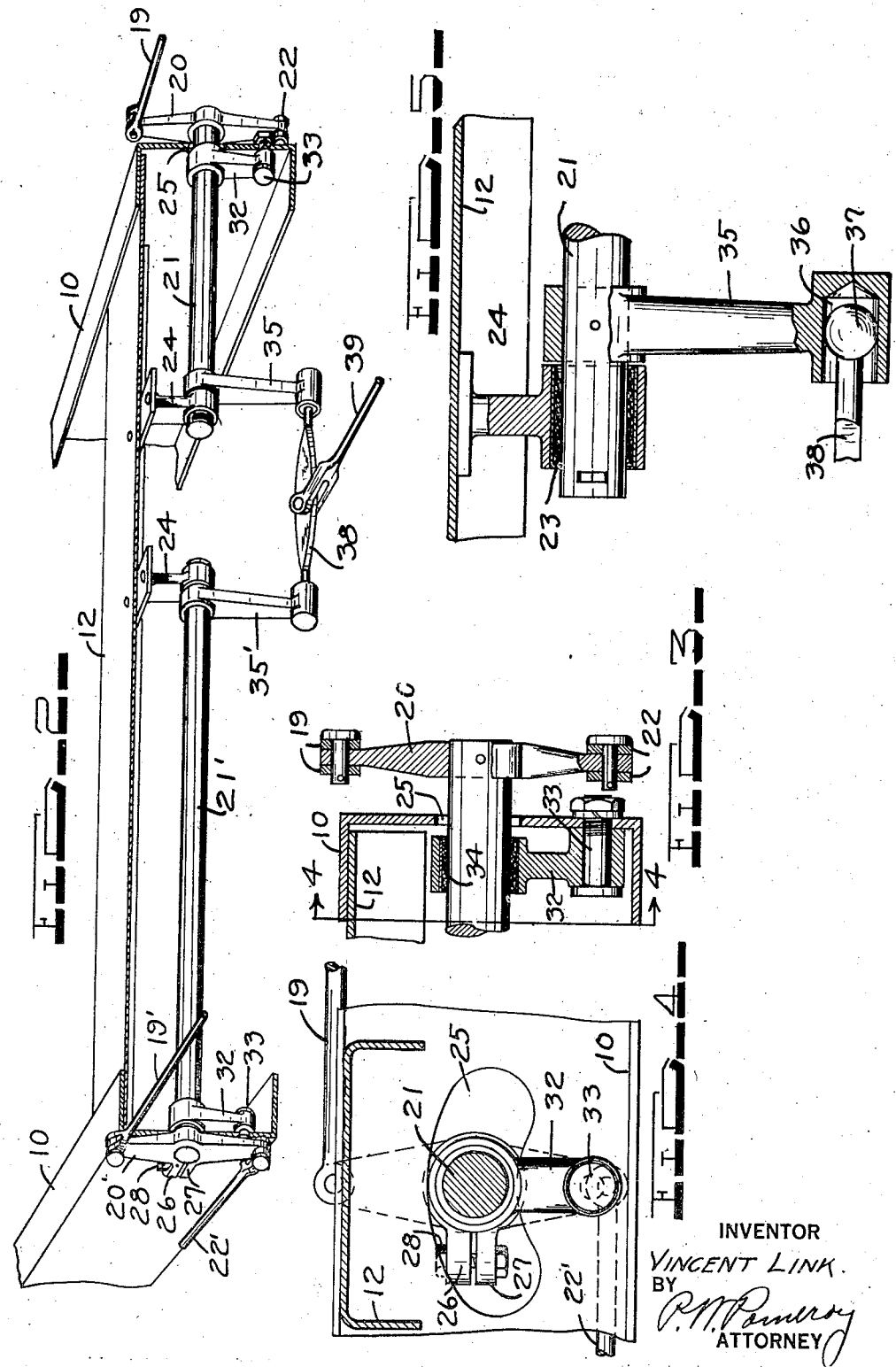

Patented Jan. 1, 1929.

1,697,533

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed July 6, 1926. Serial No. 120,669.

This invention relates to motor vehicles, and particularly to such vehicles as are provided with front and rear wheel brakes, the principal object being to provide a simplified means for applying an equal pressure to all of such brakes from a single source.

Another object is to provide a brake mechanism for a motor vehicle having brakes on all four wheels, in which each rear wheel brake is connected to the front wheel brake on the corresponding side of the vehicle through the medium of a lever mounted for bodily movement on a swingable support adapted to cause rotation thereof, each support being capable of rotation upon pressure being applied thereto through the medium of an equalizing mechanism from which a common source of pressure is derived.

Another object is to provide an equalizing mechanism for a vehicle having brakes on all four wheels thereof, in which each rear wheel brake and its corresponding front wheel brake are operatively connected together independently of the brakes on the opposite side of the vehicle by means of a bodily movable lever, each of said levers being mounted on an individual swingably mounted cross shaft, and each of said cross shafts being operatively connected together by means of an equalizing device through which they derive a common source of energy.

A further object is to provide a brake equalizing means for a motor vehicle provided with brakes on all four wheels thereof, in which such mechanism comprises connections from each rear and front wheel brake on the same side of the vehicle to a rotatable lever mounted on an individual cross shaft, each cross shaft being pivotally mounted at its inner end and supported by a pivotal lever or link at its outer end, the inner ends of such cross shafts lying in adjacent relationship and each being provided with an operating lever, said operating levers being connected together by an equalizing bar to which pressure is applied for causing operation of all the brakes.

The above being among the objects of the present invention, the same consists of certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views:

Figure 1 is a plan view of a motor vehicle chassis incorporating a suitable embodiment of the present invention.

Figure 2 is a broken perspective view of that part of the chassis incorporating the equalizing mechanism of the present invention.

Figure 3 is a fragmentary sectional view taken transversely through a chassis side frame member at the point where one of the equalizing cross shafts extends therethrough, showing the method of swingably supporting the outer end thereof and further showing the double armed lever which is connected to the front and rear wheel brakes on that side of the vehicle.

Figure 4 is a side view of the parts of Figure 3 taken on the line 4—4 of Figure 3.

Figure 5 is a fragmentary sectional view taken transversely of the vehicle through the support of the inner end of the cross shaft of Figures 3 and 4, showing the inner equalizer lever.

Figure 6 is a view similar to Figure 5, showing a modified form of means for supporting the inner ends of the equalizer cross shafts.

In the present equalizer mechanism, each front wheel brake is connected up to the rear wheel brake on the corresponding side of the vehicle through the medium of a double armed lever rotatable to apply the brakes and floatingly supported to equalize the pressure transmitted to each brake, each of these double armed levers being supported on the end of a swingably mounted cross shaft, and the opposite ends of the cross shafts being operatively connected together by an equalizer bar through which the pressure from the single brake pedal is transmitted.

Referring to the drawings, in Figure 1 is illustrated in a more or less diagrammatic manner, a motor vehicle chassis having frame side members 10, frame cross members 11 and 12, rear axle 13, rear wheels 14, rear wheel brake 15, front axle 16, front wheels 17, front wheel brakes 18, and various other parts not actively associated with the present invention. The operating mechanism of each front wheel brake 18, which may be of any conventional design, is connected by rods or cables 19 and 110

19' to the upper arms of the two armed levers 20 and 20' each of which is supported on an individual cross shaft 21 and 21' mounted transversely of the vehicle between the front axle 16 and rear axle 13. The lower arms of the levers 20 and 20' are connected by a rod or cable 22 and 22' respectively to the operating mechanism for the rear wheel brakes 15, which, like the front wheel brakes 18, may be of any conventional construction. The cross shafts 21 and 21' are supported at their inner ends in bearings such as 23 which are received in the depending ends of the brackets 24 which are secured to the under side of the frame cross member 12, the shafts 21 and 21' being positioned in approximately axially coincident relation with their ends lying in spaced relation to each other. The outer ends of the shafts 21 and 21' project through arcuate openings 25 in the frame side members 10 and receive the double armed levers 20 and 20' respectively thereon as previously described, the levers 20 and 20' being slotted on one side and being provided with two ears 26 and 27, as shown in Figure 4, through which a screw 28 passes and which serves to non-rotatably clamp the levers 20 and 20' to the shafts 21 and 21' respectively. The bearings 23 in the brackets 24, as shown in Figure 5, are of the deformable type, preferably impregnated with graphite or other lubricating substance, and are such that the outer ends of the shafts 21 and 21' may have a limited universal movement therein. In cases where such a type of bearing as 23 does not provide sufficient movement of the free ends of the cross shafts 21 and 21', a type of bearing such as shown in Figure 6 may be used to advantage.

In Figure 6 the bracket 29 which is used in place of the bracket 24, is provided with a semi-spherical recess in its lower face, and a ball such as 30 pinned on the inner ends of the shafts 21 or 21', as the case may be, is received in the recess and is held in place by a cap such as 31. The outer ends of the shafts 21 and 21' are thus supported so as to be swingable, thus floatingly supporting the levers 20 and 20'. In order to guide the outer ends of the shafts 21 and 21' and to support them for movement longitudinally of the vehicle, links 32 are provided. The links 32 are pivotally supported on pins 33 secured to side frame members 10 at a point corresponding to the circular center of the arcuate slots 25, the upper ends of the links 32 being provided with bearings 34, of the same type as support the inner ends of the shafts 21 and 21', which rotatably receive the outer ends of the shafts 21 and 21'. The outer ends of these shafts are thus supported so as to be swingable forwardly and rearwardly in the arc of a circle whose center is at the axis of the pins 33, the double levers 20 and 20' being bodily swingable in accordance therewith.

Non-rotatably secured to the shafts 21 and 21' adjacent their inner ends are the levers 35 and 35' respectively. The lower or free ends of these levers are provided with pockets 36 which receive the balls 37 on the ends of the equalizer bar 38 which extends between and joins the same. A rod 39 is pivotally secured to the center of the bar 38 and extends forwardly therefrom to the foot pedal 40 to which it is pivotally joined.

The operation of this equalizing mechanism is extremely simple. When the pedal 40 is depressed the rod 39 is drawn forward, drawing the equalizer bar 38 with it. The equalizer bar 38 being pivotally connected to the rod 39 and universally connected to the levers 35 and 35', distributes the pressure from the pedal 40 equally between the levers 35 and 35' which are caused to rotate thereby. When the levers 35 and 35' are thus rotated, the shafts 21 and 21' respectively are rotated in accordance therewith, and cause the double armed levers 20 and 20' to likewise rotate, the free ends of the upper arms of the levers 20 and 20' moving rearwardly, carrying the rods 19 rearwardly therewith and causing application of the front wheel brakes. At the same time the free ends of the lower arms of the levers 20 and 20' move forwardly, carrying therewith the rods 22 and 22' and causing application of the rear wheel brakes. In case one of the brakes takes up before the other brake on the same side of the vehicle, the resistance offered by the brake first taken up will cause the free end of the cross shaft 21 or 21', as the case may be, to move forwardly or rearwardly, as the case may be, toward the brake first taken up, bodily moving the lever 20 or 20', as the case may be, with it until both brakes are taken up equally, after which further pressure will be applied equally between both brakes on that side of the vehicle.

To more clearly illustrate this action, let us consider the left hand side of Figure 2, and assume that the front wheel brake will take up first. When the pedal is depressed, drawing the rod 39 and equalizer bar 38 with it, the free end of the lever 35' (together with the free end of the lever 35) is moved forwardly, causing the shaft 21' to rotate. When the shaft 21' rotates, the double lever 20' rotates with it, its upper free end moving rearwardly and its lower free end moving forwardly. As it has been assumed for this particular illustration that the front wheel brake will take up first, the free end of the upper arm of the lever 20' will be first affected by the resistance of applying the front wheel brake 18 on its side of the vehicle. When this occurs, further movement of the free end of the upper arm of the lever 20' will be restrained, and further rotation of the shaft 21' will cause the outer end of the shaft 21' to swing forwardly about the bracket 24 (which supports its inner end), and about the pin 33 (which secures the link 32 to the frame side member 10), thus carrying the free end of the lower arm of the lever 20′ forward until the rear wheel brake 15 is taken up to the same extent as the corresponding front wheel brake 18, after which equal pressure will be applied to both brakes upon further rotation of the shaft 21′. The same action occurs on the opposite side of the vehicle in applying the brakes as will readily be understood.

The equalizing bar 38, which joins the free ends of the levers 35 and 35′, acts to compensate for uneven wear or adjustment of the brakes on one side of the vehicle relative to the other side, it allowing the free end of the lever 35 or 35′, as the case may be, to swing more or less than the free end of the other lever in order to effect an equal distribution of the pressure thereto from the rod 39. In the above described manner, equal pressure is distributed to all the brakes to effect the application thereof.

Formal changes may be made in the specific embodiment of the invention described, without departing from the spirit and substance of the broad invention, the scope of which is commensurate with the appended claims.

What I claim is:—

1. In a brake mechanism for a motor vehicle equipped with brakes on the front and rear wheels, operating means therefor including a pair of spaced cross shafts, said shafts being operatively connected to the brakes on the front and rear wheels on the same side of the vehicles, said shafts being mounted in deformable bearings at their inner ends to permit universal movement at their inner ends and swinging movement at their outer ends.

2. In a brake mechanism for a motor vehicle equipped with brakes on the front and rear wheels, a pair of spaced cross shafts intermediate said front and rear wheels, fixed supports spaced from each other, deformable bearings mounted in said fixed supports for supporting the inner ends of said shafts and permitting universal movement thereof, a lever mounted adjacent the outer end of each shaft for connecting each front wheel brake to the rear wheel brake on the corresponding side of the vehicle, and means for applying equal pressure to each of said shafts for rotating the same to thereby actuate said brakes.

3. In a brake mechanism for a motor vehicle equipped with brakes on the front and rear wheels, a lever for connecting each front wheel brake to the rear wheel brake on the corresponding side of the vehicle, aligned cross shafts supporting said levers, said cross shafts being spaced from each other and mounted at their inner ends to permit universal movement thereof, and means for applying equal pressure to each of said shafts for rotating the same to thereby actuate said brakes.

4. In a brake mechanism for a motor vehicle equipped with brakes on the front and rear wheels, a lever connecting each front wheel brake to the rear wheel brake on the corresponding side of the vehicle, spaced cross shafts carrying each of said levers and supported to permit universal movement of the inner ends thereof independent of each other, equalizing means connecting said shafts, and means for applying pressure to said equalizing means to actuate said brakes.

5. In a device of the class described, a vehicle frame having front and rear wheels and brake mechanisms therefor, a pair of spaced shafts extending transversely of said frame, supporting means including deformable bearings permitting universal movement of said shafts, means on the outer ends of said shafts operatively connected with the front and rear brake mechanisms on adjacent sides of the frame, and actuating means including a member operatively connected with said shafts for actuating said brake mechanisms.

6. In a device of the class described, a vehicle having a frame, front and rear wheels, and brake mechanisms therefor, a pair of spaced shafts extending through said frame transversely of said vehicle, means carried by said frame for supporting the adjacent ends of said shafts and permitting universal movement thereof, links pivoted on said frame permitting swinging movement of the outer ends of said shafts, means at the outer ends of said shafts operatively connected with the front and rear brake mechanisms on the corresponding side of the vehicle, and actuating means including a member operatively connected with said shafts for actuating said brake mechanisms.

7. In a device of the class described, a vehicle frame having a cross member, front and rear wheels, and brake mechanisms therefor, a brake operating lever, a pair of spaced shafts extending transversely of the frame and supported by said cross member for universal movement independent of each other, an equalizer bar operatively connected between said operating lever and both of said shafts for equalizing torsion thereon, levers on the opposite ends of said shafts, and brake rods extending from said last named levers and operatively connected with the front and rear wheel brake mechanisms or the corresponding side of the vehicle.

Signed by me at Detroit, Michigan, U. S. A., this 1st day of July, 1926.

VINCENT LINK.